S. Hyde,
Harness,
N° 78,289. Patented May 26, 1868.
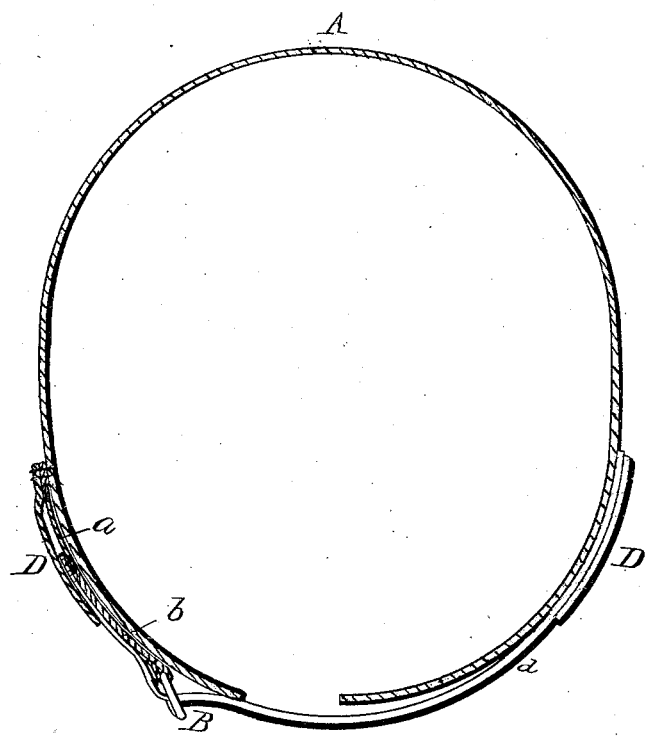
Witnesses
W. C. Ashkettle
Wm A Morgan
Inventor
S. Hyde
per Murry
Attorneys

United States Patent Office.

STEPHEN HYDE, OF NEW YORK, N. Y.

Letters Patent No. 78,289, dated May 26, 1868.

IMPROVED SURCINGLE.

The Schedule referred to in these Letters Patent and making part of the same.

TO ALL WHOM IT MAY CONCERN:

Be it known that I, STEPHEN HYDE, of the city, county, and State of New York, have invented a new and improved Surcingle; and I do hereby declare that the following is a full, clear, and exact description thereof which will enable those skilled in the art to make and use the same, reference being had to the accompanying drawings, forming part of this specification.

The object of this invention is to provide a surcingle or girth for horses which will yield sufficiently when the animal breathes or lies down or exerts himself in any unusual manner.

It consists in the interposition of two rubber straps or joints, $a$, on each side of the buckle, B, as shown. These joints are sewed to the ends of the girth or surcingle A, and to the buckle-strap $b$, as shown. The tongue-strap $d$ is sewn to the other rubber joint in the same manner.

Sheaths or coverings D D are sewed to the girth at the ends and sides of the said sheaths, the lower ends being left open to allow the rubber joint to stretch.

The rubber joints should be sufficiently stout to sustain the usual tension of a girth, and when the animal is urged to any unusual exertion, the rubber joint will permit the consequent inflation of the lungs.

By the use of this invention, a riding-saddle will be held firmly to the animal's back, without straining up the girth to accomplish that object, as is requisite when such rubber joints are not employed.

In the drawing, an edge view of the surcingle is shown, with a sectional view of one of the joints, showing the construction of the frame.

The two elastic joints of the surcingle, by being enclosed in the leather cases D, are protected from the warmth of the animal's body, and the rubber consequently preserved. These cases also prevent the saddle-cloth from being wrinkled by the elastic joints.

I claim as new, and desire to secure by Letters Patent—

As a new article of manufacture, a surcingle provided with two elastic joints, $a\ a$, when enclosed in leather cases, D, and secured to the buckle and tongue-straps $b\ d$, as herein shown and described, for the purpose specified.

STEPHEN HYDE.

Witnesses:
WM. F. MCNAMARA,
ALEX. F. ROBERTS.